United States Patent
Chrosziel et al.

(10) Patent No.: US 10,630,705 B2
(45) Date of Patent: Apr. 21, 2020

(54) REAL-TIME PUSH API FOR LOG EVENTS IN ENTERPRISE THREAT DETECTION

(71) Applicant: SAP SE, Walldorf (DE)

(72) Inventors: Florian Chrosziel, St. Leon-Rot (DE); Thomas Kunz, Lobbach/Lobenfeld (DE); Kathrin Nos, Nussloch (DE); Marco Rodeck, Maikammer (DE)

(73) Assignee: SAP SE, Walldorf (DE)

( * ) Notice: Subject to any disclaimer, the term of this patent is extended or adjusted under 35 U.S.C. 154(b) by 100 days.

(21) Appl. No.: 15/274,693

(22) Filed: Sep. 23, 2016

(65) Prior Publication Data

US 2018/0091536 A1   Mar. 29, 2018

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01); *H04L 63/1416* (2013.01); *H04L 63/1433* (2013.01)

(58) Field of Classification Search
None
See application file for complete search history.

(56) References Cited

U.S. PATENT DOCUMENTS

| | | |
|---|---|---|
| 5,440,726 A | 8/1995 | Fuchs |
| 5,960,170 A | 9/1999 | Chen |
| 6,173,418 B1 | 1/2001 | Fujino et al. |
| 6,629,106 B1 | 9/2003 | Narayanaswamy |
| 6,779,001 B1 | 8/2004 | Kanai et al. |
| 7,376,969 B1 | 5/2008 | Njemanze |
| 7,380,205 B2 | 5/2008 | Bezrukov et al. |
| 7,441,197 B2 | 10/2008 | Tschiegg et al. |
| 7,457,792 B2 | 11/2008 | Weigt et al. |
| 7,457,793 B2 | 11/2008 | Weigt et al. |
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |

(Continued)

OTHER PUBLICATIONS

Office Action in related U.S. Appl. No. 15/216,201 dated Mar. 7, 2018; 14 pages.

(Continued)

*Primary Examiner* — Andrew J Steinle
(74) *Attorney, Agent, or Firm* — Fish & Richardson P.C.

(57) ABSTRACT

A log entry is received at a streaming component of an enterprise threat detection (ETD) system from a real-time push application programming interface (API) associated with a backend computing system. The received log entry is parsed using a runtime parser associated with the streaming component into mapped data in an ETD format compatible with the ETD system. The mapped data is transferred to an ETD streaming project and enriched. The streaming component writes the enriched data into a database associated with the ETD system.

20 Claims, 4 Drawing Sheets

(56) References Cited

U.S. PATENT DOCUMENTS

| | | |
|---|---|---|
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 | 12/2017 | Averbuch |
| 9,979,741 B2 | 5/2018 | Fuhrman |
| 1,000,138 A1 | 6/2018 | Das et al. |
| 10,079,842 B1 | 9/2018 | Brandwine et al. |
| 1,010,237 A1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1* | 6/2007 | Shankar ............ H04L 63/1416 709/217 |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1* | 12/2015 | Card ............... H04L 63/20 726/23 |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0164891 A1 | 6/2016 | Satish et al. |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |
| 2017/0070415 A1 | 3/2017 | Bell et al. |

(56) References Cited

U.S. PATENT DOCUMENTS

| | | | |
|---|---|---|---|
| 2017/0091008 A1 | 3/2017 | Cherbakov |
| 2017/0093902 A1 | 3/2017 | Roundy et al. |
| 2017/0148060 A1 | 5/2017 | Showers |
| 2017/0169217 A1 | 6/2017 | Rahaman |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1 | 10/2017 | Tibshirani et al. |
| 2017/0302685 A1 | 10/2017 | Ladnai et al. |
| 2017/0308602 A1 | 10/2017 | Raghunathan et al. |
| 2017/0310690 A1 | 10/2017 | Mestha et al. |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0063167 A1 | 3/2018 | Rodeck |
| 2018/0091535 A1 | 3/2018 | Chrosziel |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

Office Action in related U.S. Appl. No. 15/274,569 dated Apr. 16, 2018; 11 pages.

Office Action in related U.S. Appl. No. 15/246,053 dated May 21, 2018; 14 pages.

Office Action in related U.S. Appl. No. 15/380,379 dated Jul. 19, 2018; 9 pages.

U.S. Office Action in related U.S. Appl. No. 15/274,569 dated Nov. 14, 2018, 11 pages.

U.S. Office Action in related U.S. Appl. No. 15/216,201 dated Jul. 20, 2018, 15 pages.

U.S. Office Action in related U.S. Appl. No. 15/253,438 dated Sep. 19, 2018, 17 pages.

U.S. Office Action in related U.S. Appl. No. 15/246,053 dated Sep. 24, 2018, 14 pages.

U.S. Office Action in related U.S. Appl. No. 15/370,084 dated Aug. 27, 2018, 14 pages.

U.S. Office Action in related U.S. Appl. No. 15/380,450 dated Aug. 27, 2018, 19 pages.

U.S. Office Action in related U.S. Appl. No. 15/380,450 dated Nov. 2, 2018, 19 pages.

U.S. Office Action in related U.S. Appl. No. 15/381,567 dated Nov. 2, 2018, 17 pages.

U.S. Office Action in related U.S. Appl. No. 15/383,771 dated Aug. 3, 2018, 12 pages.

U.S. Office Action in related U.S. Appl. No. 15/380,450 dated Jan. 23, 2019, 21 pages.

U.S. Office Action in related U.S. Appl. No. 15/383,771 dated Jan. 23, 2019, 14 pages.

Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.

Office Action issued in U.S. Appl. No. 15/216,046 dated Aug. 21, 2019, 23 pages.

Non-Final Office Action issued in U.S. Appl. No. 15/639,863 dated Jun. 24, 2019, 37 pages.

Office Action issued in U.S. Appl. No. 15/847,478, dated Aug. 6, 2019, 36 pages.

U.S. Office Action in related U.S. Appl. No. 15/383,771 dated Jul. 5, 2019, 16 pages.

Final Office Action issued in U.S. Appl. No. 15/381,567 dated May 22, 2019, 28 pages.

Non-Final Office Action issued in U.S. Appl. No. 15/216,046 dated Apr. 29, 2019, 23 pages.

Non-Final Office Action issued in U.S. Appl. No. 15/246,053 dated May 17, 2019, 28 pages.

Non-Final Office Action issued in U.S. Appl. No. 15/274,569 dated Mar. 22, 2019, 11 pages.

Final Office Action issued in U.S. Appl. No. 15/370,084 dated Feb. 4, 2019, 16 pages.

\* cited by examiner

REAL-TIME PUSH API FOR LOG EVENTS IN ENTERPRISE THREAT DETECTION

BACKGROUND

In enterprise threat detection (ETD), log events are typically written in several log persistencies by applications connected to an ETD system. These log entries are then read asynchronously (for example, periodically every minute) by an application interface associated with each application, converted into a particular format, and sent to the ETD system. Asynchronous operation in ETD is inefficient and introduces unnecessary complexity.

Additionally, some logging is configurable. In case a log is not configured (or only partly configured) or incorrectly configured, required log events will not be written/transferred to the ETD system. Other events that may be useful/necessary for proper ETD are not written to any log or configured to be part of ETD due to time and cost reasons. The lack of received logs (due to errors or lack of set up), reduces the effectiveness of ETD functionality.

SUMMARY

The present disclosure describes methods and systems, including computer-implemented methods, computer program products, and computer systems for providing a real-time push application programming interface (API) for enterprise threat detection (ETD).

In an implementation, s log entry is received at a streaming component of an enterprise threat detection (ETD) system from a real-time push application programming interface (API) associated with a backend computing system. The received log entry is parsed using a runtime parser associated with the streaming component into mapped data in an ETD format compatible with the ETD system. The mapped data is transferred to an ETD streaming project and enriched. The streaming component writes the enriched data into a database associated with the ETD system.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, log events can be sent synchronously and more efficiently than current asynchronous methods. Second, complicated functionality to manage application-level log persistencies are not needed as they are for asynchronous log entry transmission to the ETD system. This helps simplify log entry transmission to the ETD system. Third, log entries are sent without depending on log configurations/filters on the application side. This helps prevent errors in configuration/filters that may erroneously prevent log entries from being sent to the ETD system. As log entries are analyzed and mapped by a receiving ETD system to a normalized format log, analysis/mapping can be controlled in a centralized location for consistency. Fourth, the system permits log entries not normally sent to an ETD system to be sent without pre-configuration and set up on the application side. This permits the ETD system to receive very useful and necessary data for ETD analysis. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes a real-time push application programming interface (API) for enterprise threat detection (ETD) and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

In ETD, log events are typically written in several log persistencies by applications connected to an ETD system. These log entries are then read asynchronously (for example, periodically every minute) by an application interface associated with each application, converted into a particular format, and sent to the ETD system. Asynchronous operation in ETD is inefficient and introduces unnecessary complexity.

Additionally, some logging is configurable. In case a log is not configured (or only partly configured) or incorrectly configured, required log events will not be written/transferred to the ETD system. Other events that may be useful/necessary for proper ETD are not written to any log or configured to be part of ETD due to time and cost reasons. The lack of received logs (due to errors or lack of set up), reduces the effectiveness of ETD functionality.

Described is a push API configured to send log entries synchronously and in real time as the log entries are written to a legacy persistence coupled with an ETD system and immediately transmitted to the ETD system. In this way, an asynchronous border is removed from the process of transferring log entries from an application to an ETD system.

Figure 1:
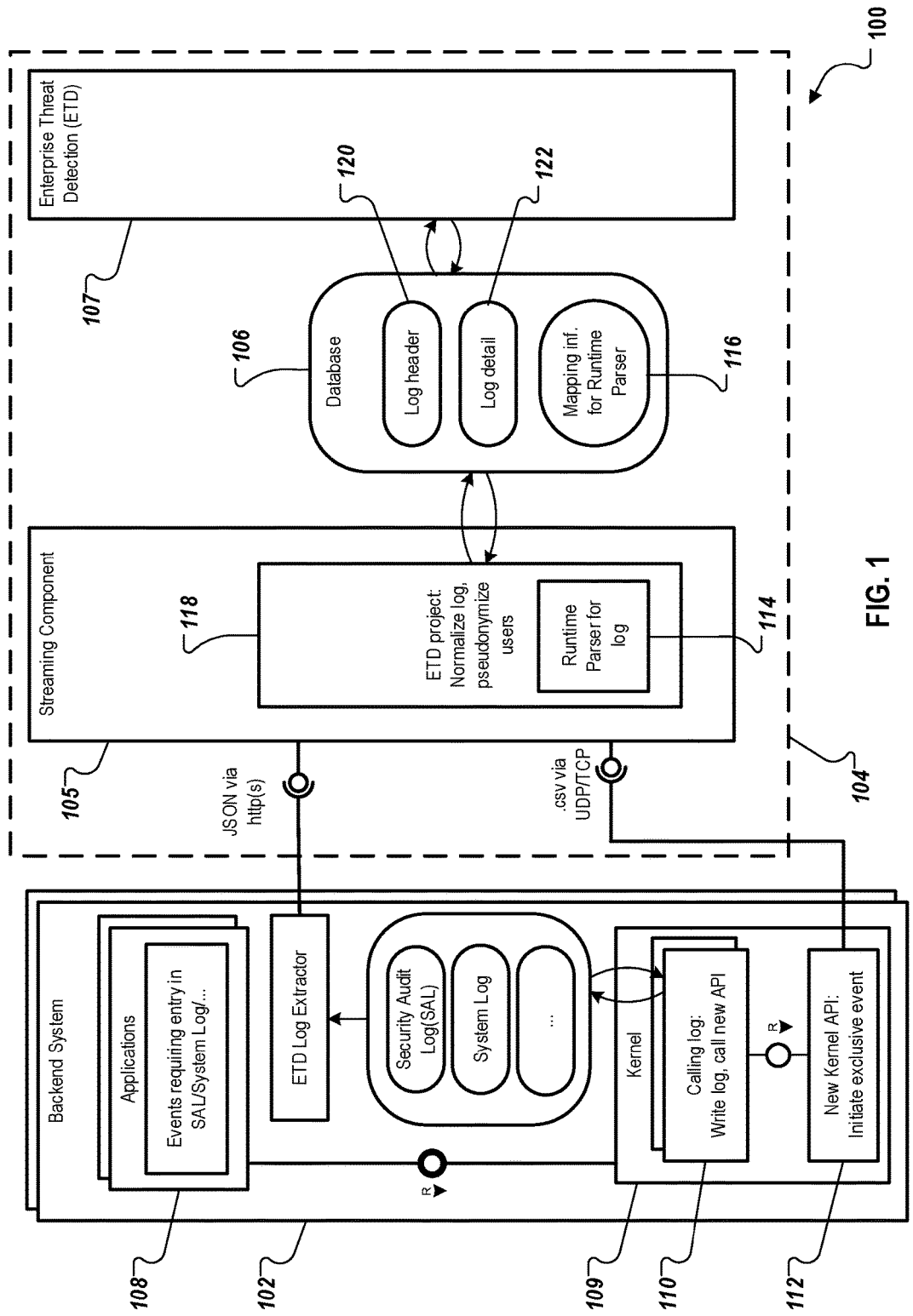
FIG. 1 is a block diagram of an example system for providing a real-time push application programming interface (API) for enterprise threat detection (ETD).

FIG. 1 is a block diagram of an example system 100 for providing a real-time push API for ETD, according to an implementation. System 100 includes a backend system 102 and ETD system 104 (indicated by a dashed line). In typical implementations, the ETD system 104 includes an event streaming component 105, database 106, and ETD 107 functionality. In the backend system 102, logs are written by an application 108 into a kernel 109 using log writing component 110. Logging is typically implemented in the kernel 109 which is configured, when called at runtime by the application 108, to write log entries to a persistence (for example, files on an operating system Level). The kernel 109 is enhanced with the described real-time push API 112 which is called by the log writing component 110.

The real-time push API 112 transmits the log event to a streaming component 105 (for example, an event stream processor (ESP) or a smart data streaming (SDS) service (for example, SAP HANA SDS). In other implementations, the streaming component 105 can be partially or wholly remote from the ETD system 104.

The log entry is received by a runtime parser 114 for log data which recognizes a log type of the log entry and parses the log entry using at least the mapping information 116. The parsing splits the log entry (see, for example, 202 in FIG. 2) into its elements and maps the elements into an ETD internal data structure (see, for example, 204 in FIG. 2). Once the log entry is parsed by the runtime parser 114, the mapped data is written to an ETD streaming project 118 executing on the streaming component 105.

The ETD streaming project 118 enriches the mapped data (for example, by incorporating user information, subnet information, MAC addresses, etc.) and writes the enriched log entry to a database 106 (for example a SAP HANA in-memory database) using the streaming component 105. In the illustrated example, the enriched log data is written to the database 106 as log header 120 and log detail data 122.

In the described implementation, in contrast to typical ETD log processing (for example, using persistencies for queuing/caching, configurations, and conversion routines that introduce periodic delay in processing log events), all log entries can be sent immediately in real-time to the ETD system 104 upon writing by the kernel 109. The real-time push API 112 is implemented with the existing log writing component 110 to write and send a log to the ETD system 104 before a configuration is evaluated to handle the particular log entry. In this way, all log entries can be sent to the ETD system 104 without the necessity of complex configurations/persistencies for determining which log entries to send to the ETD system 104. In other words, new events can be introduced easily to the ETD system 104 by calling the real-time push API 112 once the event occurs in backend system 102. This, for example, enhances the quality and completeness of data to the ETD system 104, increasing the effectiveness of ETD analysis.

As stated above when using the described real-time push API, sending log entries to the ETD system 104 is not dependent on log configurations. Some logs are configurable (for example, describing what data is to be logged into the ETD system 104) and laws/regulations in some countries prevent logging of particular events (for example, in Germany it is typically unlawful to log logon/logoff events pertaining to a user as a user's schedule can then be determined). Current logging limitations typically depend on filters for the particular events and errors in the filters can result in improper logging of data, loss of log data that should be logged but for an erroneous filter, etc. In the current implementation, a central process (for example, the streaming component 105, runtime parser 114, ETD streaming project 118, etc.) can handle management of log data and whether it is ultimately logged in a database 106 or discarded as unauthorized. The ETD system 104 is typically highly restricted with respect to access, so it is considered highly secure and can store log data that would otherwise be considered unauthorized.

Figure 2:
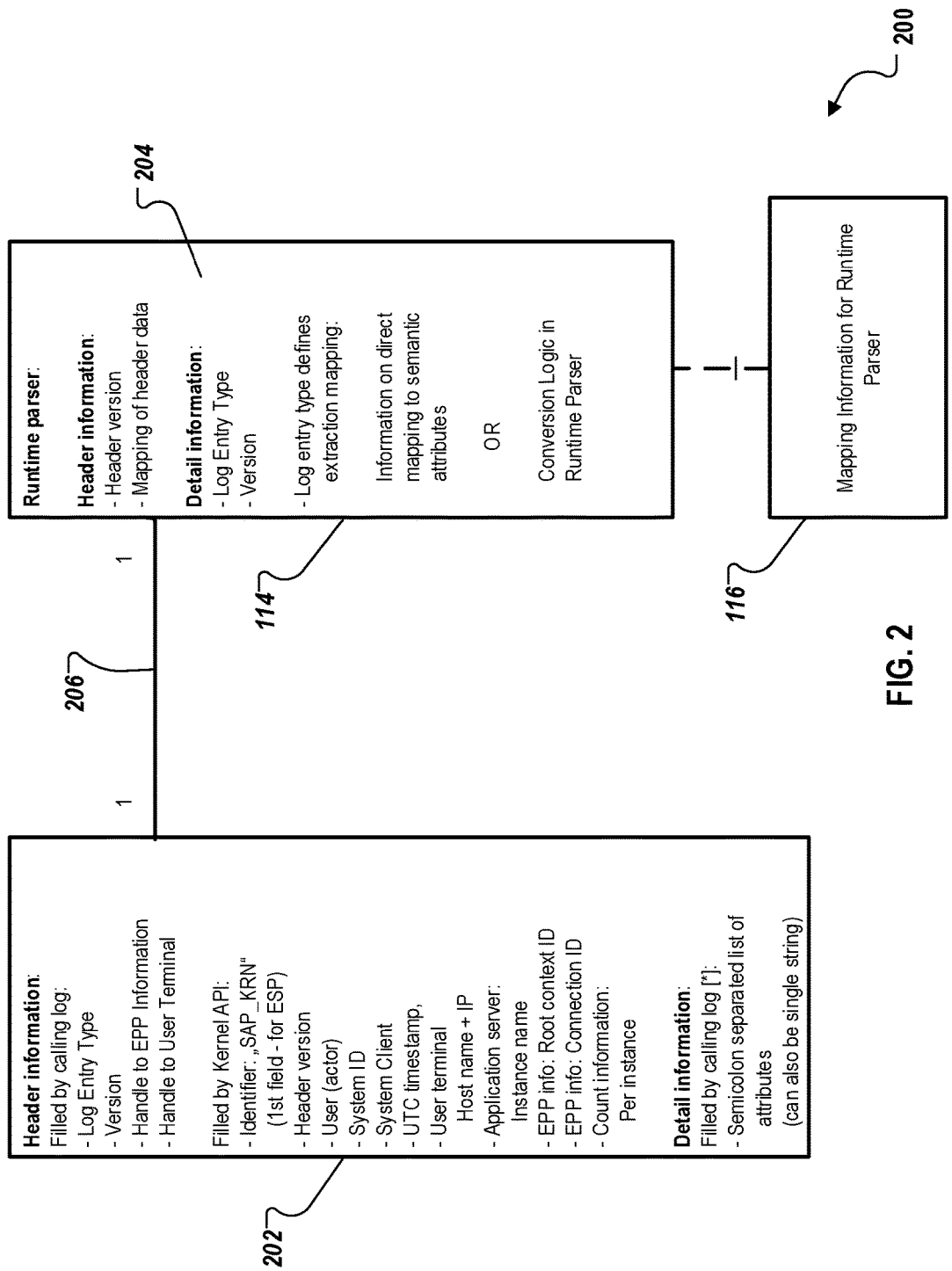
FIG. 2 is a block diagram of a data model/structure sent by the real-time push API from a back-end computing system to an ETD system, according to an implementation.

The described real-time push API 112 receives log entries in real-time, pushes the log entry to the streaming component 105, the runtime parser 114 analyzes/recognizes/validates the log entry and extracts information from the log entry (for example, determines an updated event count based on the log entry), uses the ETD streaming project 118 to map/enrich the log entry information (for example, normalizes and pseudonymizes users in log entry data) (see 202 in FIG. 2) to mapped data (see 204 FIG. 2). The mapped data 204 is then available for use by the ETD 107 functionality.

FIG. 2 is a block diagram 200 of a data model/structure sent by the real-time push API from a back-end computing system to an ETD system 104, according to an implementation. Data model/structure 202 is sent by the real-time push API 112 from the backend-computing system 102 (for example, an ABAP backend system) to the runtime parser 114 of ETD system 104. In some implementations, data model/structure 202 can include header information (such as that filled by a calling log—log entry type, version, etc.—and kernel API—identifier, header version, user, system ID, etc.) and detail information. The example data model/structure 202 is a representative example of one possible implementation and is not meant to limit the disclosure to the particular example.

Mapped data 204 represents an example representation of how the data model/structure 202 is mapped by the runtime parser 114 using mapping information 116. In some implementations, mapped data 204 can include header information (such as header version, mapping for header data, etc.) and detail information (such as log entry type, version, what the log entry defines, etc.). The example mapped data 204 is a representative example of one possible implementations and is not meant to limit the disclosure to the particular example. In typical implementations, the mapping between data/model structure 202 and mapped data 204 is one-to-one as indicated by association 206. The mapping information 116 provides, for example, semantic event information (for example, which semantic attributes to fill, whether to retrieve information from a knowledge base (not illustrated), etc.).

Figure 3:
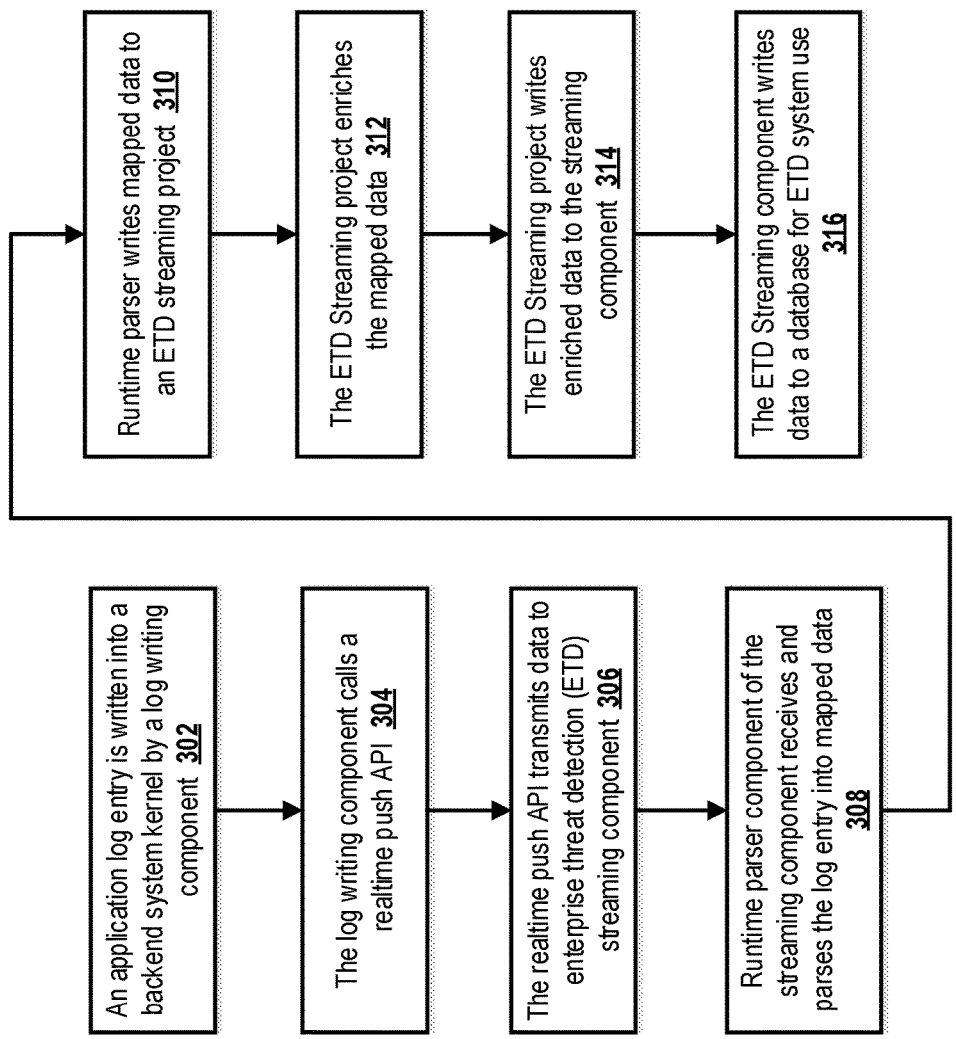
FIG. 3 is a flowchart of an example method for providing a real-time push API for ETD, according to an implementation.

FIG. 3 is a flowchart of an example method 300 for providing a real-time push API for ETD, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At 302, an application log entry is written into a backend system kernel log writing component. From 302, method 300 proceeds to 304.

At 304, the kernel log writing component calls a realtime push API to transmit the log entry to an ETD streaming component. From 304, method 300 proceeds to 306.

At 306, the realtime push API transmits the log entry to the ETD streaming component. From 306, method 300 proceeds to 308.

At 308, a runtime parser component of the streaming component receives and parses the log entry into mapped data. In typical implementations, parsing the log entry includes splitting the received log entry into elements and mapping the elements into an ETD format. The runtime parser uses typically uses mapping information to perform the parsing. From 308, method 300 proceeds to 310.

At 310, the runtime parser writes the mapped data to an ETD streaming project for enrichment into enriched data. From 310, method 300 proceeds to 312.

At 312, the ETD streaming project enriches the mapped data. In typical implementations, enriching the mapped data includes at least one of normalizing the mapped data, pseudonymizing users, or incorporating at least one of user information, subnet information, or a MAC address. From 312, method 300 proceeds to 314.

At 314, the ETD streaming project writes the enriched data to the streaming component. From 314, method 300 proceeds to 316.

At 316, the streaming component writes the enriched data to a database for ETD system use. After 316, method 300 stops.

Figure 4:
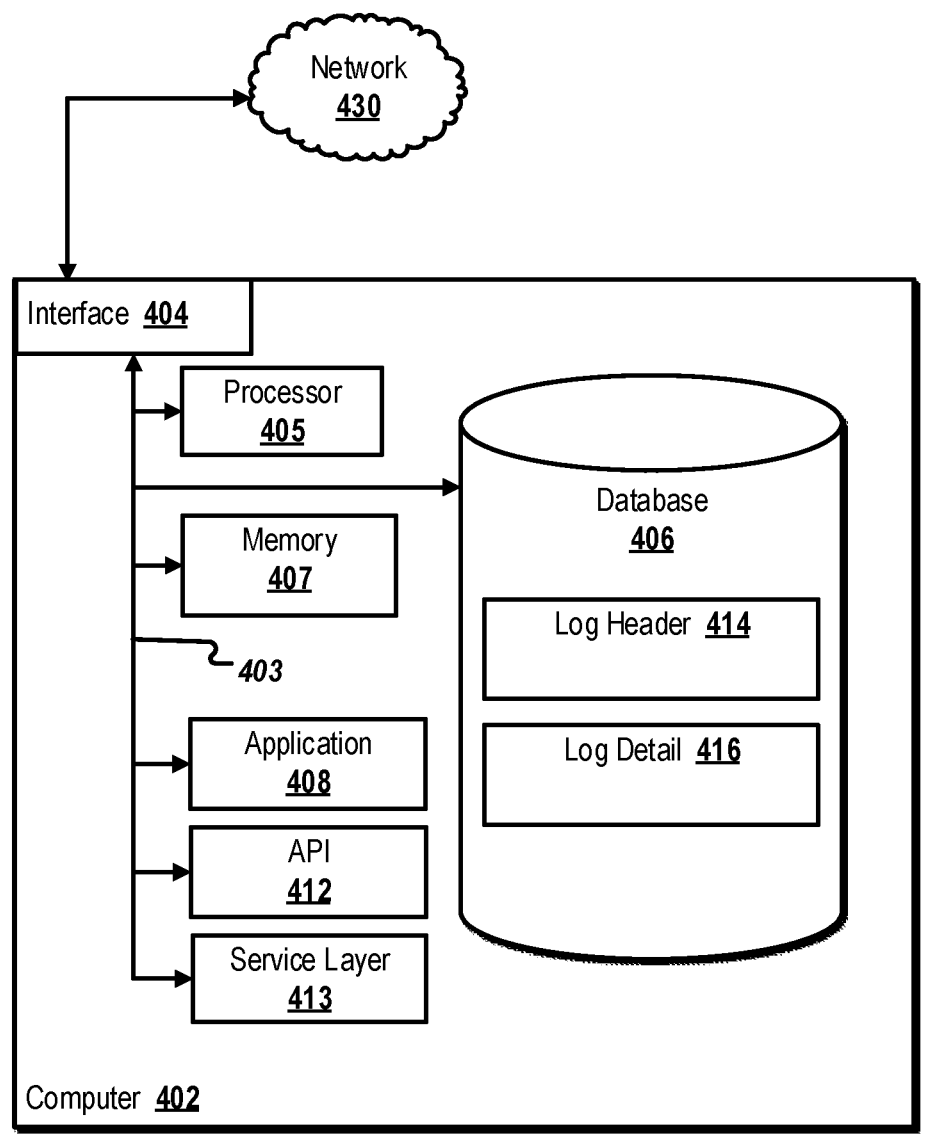
FIG. 4 is a block diagram of an exemplary computer system used to provide computational functionalities associated with described algorithms, methods, functions, processes, flows, and procedures as described in the instant disclosure, according to an implementation.

FIG. 4 is a block diagram of an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a GUI.

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 (for example, database 106) that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402. As illustrated in FIG. 4, database 406 contains both log header 414 and log detail 416 data (for example, illustrated as log header 107 and log detail 120, respectively, in FIG. 1).

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, applications, etc. Further, although illustrated as a single application 408, the application 408 may be implemented as multiple applications 407 on the computer 402. In addition, although illustrated as integral to the computer 402, in alternative implementations, the application 408 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method, comprising: receiving a log entry at a streaming component of an enterprise threat detection (ETD) system from a real-time push application programming interface (API) associated with a backend computing system; parsing the log entry using a runtime parser associated with the streaming component into mapped data in an ETD format compatible with the ETD system; transferring the mapped data to an ETD streaming project for enrichment; enriching the mapped data as enriched data; and writing, using the streaming component, the enriched data into a database associated with the ETD system.

The foregoing and other described implementations can each optionally include one or more of the following features:

A first feature, combinable with any of the following features, comprising receiving a log entry generated by application on the backend computing system at a kernel log writing component.

A second feature, combinable with any of the previous or following features, comprising the log writing component instructing the real-time push API to send the log entry to the streaming component.

A third feature, combinable with any of the previous or following features, comprising: splitting the received log entry into elements; and mapping the elements into the ETD format.

A fourth feature, combinable with any of the previous or following features, wherein parsing the received log entry includes the runtime parser using mapping information for mapping a format of the received log entry to the ETD format.

A fifth feature, combinable with any of the previous or following features, wherein enriching the mapped data includes at least one of normalizing the mapped data, pseudonymizing users, or incorporating at least one of user information, subnet information, or a MAC address.

A sixth feature, combinable with any of the previous or following features, comprising writing the enriched data from the ETD streaming project to the streaming component.

In a second implementation, a non-transitory, computer-readable medium storing one or more instructions executable by a computer system to perform operations comprising: receiving a log entry at a streaming component of an enterprise threat detection (ETD) system from a real-time push application programming interface (API) associated with a backend computing system; parsing the log entry using a runtime parser associated with the streaming component into mapped data in an ETD format compatible with the ETD system; transferring the mapped data to an ETD streaming project for enrichment; enriching the mapped data as enriched data; and writing, using the streaming component, the enriched data into a database associated with the ETD system.

The foregoing and other described implementations can each optionally include one or more of the following features:

A first feature, combinable with any of the following features, comprising one or more instructions to receive a log entry generated by application on the backend computing system at a kernel log writing component.

A second feature, combinable with any of the previous or following features, comprising one or more instructions for the log writing component to instruct the real-time push API to send the log entry to the streaming component.

A third feature, combinable with any of the previous or following features, comprising one or more instructions to: split the received log entry into elements; and map the elements into the ETD format.

A fourth feature, combinable with any of the previous or following features, wherein parsing the received log entry includes the runtime parser using mapping information for mapping a format of the received log entry to the ETD format.

A fifth feature, combinable with any of the previous or following features, wherein enriching the mapped data includes at least one of normalizing the mapped data, pseudonymizing users, or incorporating at least one of user information, subnet information, or a MAC address.

A sixth feature, combinable with any of the previous or following features, comprising one or more instructions to write the enriched data from the ETD streaming project to the streaming component.

In a third implementation, a computer-implemented system, comprising: a computer memory; and a hardware processor interoperably coupled with the computer memory and configured to perform operations comprising: receiving a log entry at a streaming component of an enterprise threat detection (ETD) system from a real-time push application programming interface (API) associated with a backend computing system; parsing the log entry using a runtime parser associated with the streaming component into mapped data in an ETD format compatible with the ETD system; transferring the mapped data to an ETD streaming project for enrichment; enriching the mapped data as enriched data; and writing, using the streaming component, the enriched data into a database associated with the ETD system.

The foregoing and other described implementations can each optionally include one or more of the following features:

A first feature, combinable with any of the following features, further configured to receive a log entry generated by application on the backend computing system at a kernel log writing component.

A second feature, combinable with any of the previous or following features, further configured to permit the log writing component to instruct the real-time push API to send the log entry to the streaming component.

A third feature, combinable with any of the previous or following features, further configured to: split the received log entry into elements; and map the elements into the ETD format.

A fourth feature, combinable with any of the previous or following features, wherein parsing the received log entry includes the runtime parser using mapping information for mapping a format of the received log entry to the ETD format.

A fifth feature, combinable with any of the previous or following features, wherein enriching the mapped data includes at least one of normalizing the mapped data, pseudonymizing users, or incorporating at least one of user information, subnet information, or a MAC address.

A sixth feature, combinable with any of the previous or following features, further configured to write the enriched data from the ETD streaming project to the streaming component.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving a log entry at a streaming component of an enterprise threat detection (ETD) system from a real-time push application programming interface (API) associated with a backend computing system, wherein a kernel log writing component of the backend computing system calls the real-time push API associated with the backend computing system to transmit the log entry to the streaming component of the ETD system when the log entry is written into the kernel log writing component of the backend computing system;
parsing the log entry using a runtime parser associated with the streaming component into mapped data in an ETD format compatible with the ETD system;
transferring the mapped data to an ETD streaming project for enrichment;
enriching the mapped data as enriched data; and
writing, using the streaming component, the enriched data into a database associated with the ETD system.

2. The computer-implemented method of claim 1, comprising receiving the log entry generated by an application on the backend computing system at the kernel log writing component.

3. The computer-implemented method of claim 2, comprising the log writing component instructing the real-time push API to send the log entry to the streaming component.

4. The computer-implemented method of claim 1, comprising:
splitting the received log entry into elements; and
mapping the elements into the ETD format.

5. The computer-implemented method of claim 1, wherein parsing the received log entry includes the runtime parser using mapping information for mapping a format of the received log entry to the ETD format.

6. The computer-implemented method of claim 1, wherein enriching the mapped data includes at least one of normalizing the mapped data, pseudonymizing users, or incorporating at least one of user information, subnet information, or a MAC address.

7. The computer-implemented method of claim 1, comprising writing the enriched data from the ETD streaming project to the streaming component.

8. A non-transitory, computer-readable medium storing one or more instructions executable by a computer system to perform operations comprising:
receiving a log entry at a streaming component of an enterprise threat detection (ETD) system from a real-time push application programming interface (API) associated with a backend computing system, wherein a kernel log writing component of the backend computing system calls the real-time push API associated with the backend computing system to transmit the log entry to the streaming component of the ETD system when the log entry is written into the kernel log writing component of the backend computing system;
parsing the log entry using a runtime parser associated with the streaming component into mapped data in an ETD format compatible with the ETD system;
transferring the mapped data to an ETD streaming project for enrichment;
enriching the mapped data as enriched data; and
writing, using the streaming component, the enriched data into a database associated with the ETD system.

9. The non-transitory, computer-readable medium of claim 8, comprising one or more instructions to receive the log entry generated by an application on the backend computing system at the kernel log writing component.

10. The non-transitory, computer-readable medium of claim 9, comprising one or more instructions for the log writing component to instruct the real-time push API to send the log entry to the streaming component.

11. The non-transitory, computer-readable medium of claim 8, comprising one or more instructions to:
split the received log entry into elements; and
map the elements into the ETD format.

12. The non-transitory, computer-readable medium of claim 8, wherein parsing the received log entry includes the runtime parser using mapping information for mapping a format of the received log entry to the ETD format.

13. The non-transitory, computer-readable medium of claim 8, wherein enriching the mapped data includes at least one of normalizing the mapped data, pseudonymizing users, or incorporating at least one of user information, subnet information, or a MAC address.

14. The non-transitory, computer-readable medium of claim 8, comprising one or more instructions to write the enriched data from the ETD streaming project to the streaming component.

15. A computer-implemented system, comprising:
a computer memory; and
a hardware processor interoperably coupled with the computer memory and configured to perform operations comprising:
receiving a log entry at a streaming component of an enterprise threat detection (ETD) system from a real-time push application programming interface (API) associated with a backend computing system, wherein a kernel log writing component of the backend computing system calls the real-time push API associated with the backend computing system to transmit the log entry to the streaming component of the ETD system when the log entry is written into the kernel log writing component of the backend computing system;
parsing the log entry using a runtime parser associated with the streaming component into mapped data in an ETD format compatible with the ETD system;
transferring the mapped data to an ETD streaming project for enrichment;
enriching the mapped data as enriched data; and
writing, using the streaming component, the enriched data into a database associated with the ETD system.

16. The computer-implemented system of claim 15, further configured to:
receive the log entry generated by an application on the backend computing system at the kernel log writing component; and
to permit the log writing component to instruct the real-time push API to send the log entry to the streaming component.

17. The computer-implemented system of claim 15, further configured to:
split the received log entry into elements; and
map the elements into the ETD format.

18. The computer-implemented system of claim 15, wherein parsing the received log entry includes the runtime parser using mapping information for mapping a format of the received log entry to the ETD format.

19. The computer-implemented system of claim 15, wherein enriching the mapped data includes at least one of normalizing the mapped data, pseudonymizing users, or incorporating at least one of user information, subnet information, or a MAC address.

20. The computer-implemented system of claim 15, further configured to write the enriched data from the ETD streaming project to the streaming component.

* * * * *